(No Model.)

H. HAAK.
CREAMING CAN.

No. 326,426. Patented Sept. 15, 1885.

Witnesses:
Wm Duvall
T. L. Fracker

Inventor:
Henry Haak,
by E. B. Stocking
Attorney.

his invention has relation to creaming-cans employed in the process of raising cream from milk, which involves the "deep-setting" or Swedish method; and the principal object of the invention is to produce a can of such a configuration and relative proportion of its several parts as to facilitate or expedite the separation of cream from milk, and the elimination of gases and animal odor therefrom.

UNITED STATES PATENT OFFICE.

HENRY HAAK, OF PRESCOTT, PENNSYLVANIA.

CREAMING-CAN.

SPECIFICATION forming part of Letters Patent No. 326,426, dated September 15, 1885.

Application filed November 1, 1884. (No model.)

*To all whom it may concern:*

Be it known that I, HENRY HAAK, a citizen of the United States, residing at Prescott, in the county of Lebanon and State of Pennsylvania, have invented certain new and useful Improvements in Creaming-Cans, of which the following is a specification, reference being had to the accompanying drawings.

This invention has relation to creaming-cans employed in the process of raising cream from milk, which involves the "deep-setting" or Swedish method; and the principal object of the invention is to produce a can of such a configuration and relative proportion of its several parts as to facilitate or expedite the separation of cream from milk, and the elimination of gases and animal odor therefrom.

The novel features of the invention will be particularly pointed out in the claim.

Figure 1:
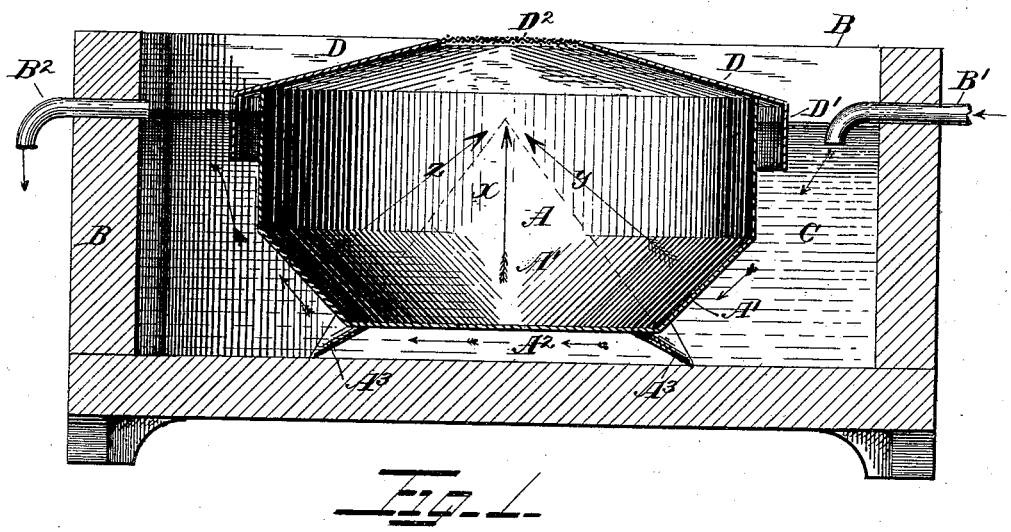
Figure 2:
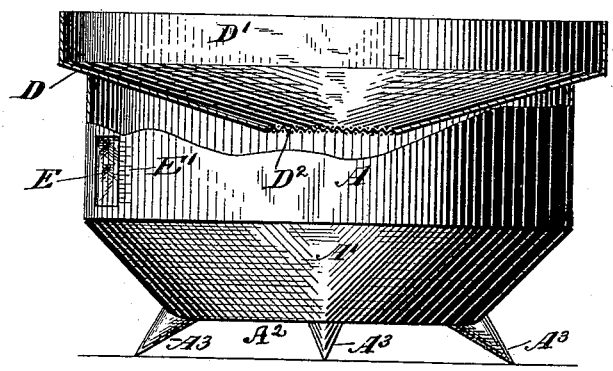

Referring to the drawings, Figure 1 is a central vertical section of a creaming-can constructed in accordance with my invention, and arranged in a vat of ordinary construction. Fig. 2 is a side elevation, partly in section, of the can with its cover inverted as a strainer.

Like letters indicate like parts in all the figures.

It is well understood that in the above-specified method of raising cream, and by reason of the contact of the cooling agent at the outside of the can, the animal heat is driven from the milk, and that a change of the temperature within certain limits of the milk expedites a separation of the cream therefrom.

Without asserting the correctness of any theory of the action of refrigerants upon bodies of liquid—such as fresh milk—I have found by actual use that my creaming-can possesses advantages which I have failed to gain in others. I may state that I believe its advantages to be the result of so disposing the surfaces of the can with relation to each other that (if the cooling effect of a refrigerant upon liquids diminishes gradually to a point substantially central over and at a distance from the surface to which the refrigerant is applied, proportionate to its area, as I have reason to believe is the case,) the diminishing points of such surfaces shall substantially coincide, as indicated by the arrows X, Y, and Z, Fig. 1, so that the point of intersection of said arrows being substantially at the surface of the milk, said gases are allowed to freely escape, and are not confined at and slow to leave the surface of the milk; or, in case the surface of the milk is above said point, said gases and odors again commingle with the milk, which would be the case if the upper cylindrical portion of the can is of too great a height proportionate to the flared portion thereof and the milk within the can excessive in depth.

To secure the operation above indicated, I construct the can with the upper half, A, of the body portion thereof cylindrical, and the lower half, A', flared inwardly to be joined or merged into a flat base, A², which is provided with feet A³, in order that the refrigerative agent (which may be running water within the tank B, as stated) may take the course indicated by the arrows, the pipe B' serving as an inlet and the pipe B² as an overflow or outlet for the refrigerative agent.

The entire can may be constructed of a single sheet of metal struck up; or, if desired, joints may be formed at any of the angles where the specified portions of the bottom and the body join each other.

The can is provided with a cover, D, having a depending flange, D', serving to form a water-seal. In this instance the cover is provided with a ventilator in the form of a strainer, D², so that by a reversal of the cover, as shown in Fig. 2, it may be used to strain the milk at the time it is put in the can.

I have specified that the upper cylindrical and lower flaring portions of the body of the can are each substantially one-half the depth of the body, and this feature of proportion is in a measure essential to a successful operation of my invention, although an immaterial variation of such proportions would not be fatal to securing more or less advantage, the main principle of construction being that lines drawn at right angles from the base, the flaring portion, and the body portion will intersect at a point substantially in the center of the can, and at or about the surface of the milk therein.

If desired, a transparent window, E, and a cream-scale, E', may be provided in order to measure the depth of the cream within the can, but such accessories are in common use, and have no direct bearing upon the process of raising cream, and I therefore do not lay claim therefor, nor restrict my invention to cans provided therewith.

I am aware that heretofore cylindrical cans on legs have been used in tanks in connection with a water-seal cover, and that invertible straining-covers have been used in connection with milk-pails, and that cylindrical cans having the greater portion flaring and ventilators in the lesser portion of its cylindrical body are old, and I do not claim such as of my invention.

Having described my invention and its operation, what I claim is—

As an article of manufacture, the creaming-can shown and described, comprising the cover D, having the flange D' and central strainer, $D^2$, the vertical body portion A, substantially the lower half of which is inclined, as at A', and the bottom $A^2$, having feet $A^3$, parts being proportioned as specified, substantially as and for the purposes set forth.

In testimony whereof I affix my signature in presence of two witnesses.

HENRY HAAK.

Witnesses:
E. B. STOCKING,
WM. S. DUVALL.